United States Patent [19]

Fulton et al.

[11] Patent Number: 4,484,126
[45] Date of Patent: Nov. 20, 1984

[54] INDUCTION MOTOR CONTROLLER

[75] Inventors: Donald E. Fulton, Stoneham; Robert H. Comstock, Andover, both of Mass.

[73] Assignee: IMEC Corporation, Boston, Mass.

[21] Appl. No.: 415,682

[22] Filed: Sep. 7, 1982

[51] Int. Cl.³ ............................................. H02P 5/40
[52] U.S. Cl. ................................. 318/800; 318/808; 318/809; 318/812
[58] Field of Search ............... 318/803, 808, 809, 811, 318/800, 812

[56] References Cited

U.S. PATENT DOCUMENTS 4,310,791  1/1982  Akamatsu ..................... 318/800
4,361,794 11/1982  Kawada ........................ 318/811

Primary Examiner—David Smith, Jr.
Attorney, Agent, or Firm—Lee & Hollander

[57] ABSTRACT

The present invention generates a motor slip frequency value and two current magnitude values representing quadrature components of the motor stator current to be generated. Closed-loop control of the motor operation is provided by feeding back a signal representative of the motor shaft speed or position calculate the torque required from the motor. The feedback signal is separated into high and low frequency components. Additional circuitry changes the value in response to detected variations in the high frequency components of the feedback signal. The addition of this circuitry causes the motor control circuit to no longer represent the inverse of the motor transfer function network.

17 Claims, 7 Drawing Figures

4,484,126

INDUCTION MOTOR CONTROLLER

FIELD OF THE INVENTION

This invention relates to induction motor controllers, and more specifically relates to induction motor controllers for use with digital control systems.

BACKGROUND OF THE INVENTION

In electric motor applications it is frequently desirable to have precise control over the dynamic operation of the motor. The specific parameter being controlled may be the motor speed, the motor shaft position, or the motor torque output. Until recently, DC motors have been almost exclusively used in these applications because their flux and torque can be easily controlled by controlling the field and armature currents of such a motor. DC motors, however, have limitations imposed by their commutators and brushes, including the need for periodic maintenance, and restrictions on the range of operation caused by the limited capability of the commutator and brushes to conduct current and to withstand high-voltage operation.

Induction or AC motors have no brushes and commutators and therefore do not suffer from these limitations, but until recently, induction motor controller circuits have been complicated, expensive and less accurate than DC motor controllers. Although induction motors were invented by Tesla in the 1890's, the dynamics of the operation of induction motors have not been truly understood until relatively recently. With the development of relatively inexpensive computers and digital control systems, the potential for increased productivity and lower cost has created a large demand for induction motor control circuits which can accurately control motor operation.

To provide accurate control of a motor's speed or position, the motor controller circuit must provide rapid and accurate control of the motor torque output in response to a torque command input signal. Recent research has discovered that an induction motor may be modelled as shown in FIG. 1A. In FIG. 1A, two input parameters, $I_F$ and $I_T$ control the rotor flux, motor torque, and motor slip frequency, $w_s$. $L_m$, $w_r$, and $R_r$ respectively represent the magnetizing inductance, rotor natural frequency, and rotor resistance of the induction motor. If the inverse of the motor model shown in FIG. 1A is created, the diagram of FIG. 1B results. FIG. 1B represents a motor controller circuit having two inputs which determine the rotor flux and the motor torque produced by the motor. The outputs from the circuit of FIG. 1B are $I_F$ and $I_T$, which may be used to control the stator current applied to the motor, as described in more detail below, and a value representing the slip frequency of the motor. A detailed explanation of the derivation of the diagrams shown in FIGS. 1A and 1B may be found in "An Approach to Flux Control of Induction Motors Operated With Variable Frequency Power Supply", by A. Nabae, et. al., IAS/IEE Annual Record 1978, pgs. 890-896.

To construct a simple and practical motor controller, it is desirable to be able to produce an output torque from the motor in response to and as a linear function of an input torque command signal. It is a basic principal of networks that given a transfer function relating output values to input variables, the inverse of that function will produce the input variables required to produce a desired output. This is shown diagrammatically in FIG. 1C. If a system has a transfer function F, relating the output states A and B of the system to input variables X and Y, the inverse, $F^{-1}$, of the function will predict the inputs X and Y required to provide output states A and B. In response to inputs representing a desired torque and rotor flux, the transfer function represented in FIG. 1B will provide the quadrature components $I_F$ and $I_T$ necessary to produce the desired torque at the commanded rotor flux and the slip frequency $w_s$ which is also generated by the transfer function shown in FIG. 1B.

A few motor controllers have been developed based on the model of an induction motor shown in FIG. 1B. These controllers are sometimes known as flux-feed-forward controllers and depend upon using a network which is an accurate inverse of the motor being controlled. See, for example, U.S. Pat. Nos. 4,259,628 and 4,259,629. Presently available induction motor controllers, however, have limitations, particularly with respect to the bandwidth over which the motor dynamic response may be controlled, especially in applications where an induction motor is controlled by a digital control system having a limited data throughput capacity.

SUMMARY OF THE INVENTION

The present invention includes a flux-feed-forward type of induction motor controller in which the parameters controlled are motor current and slip frequency. In previously known controllers of the flux-feed-forward type, the controller structure is essentially a network which is an accurate inverse of the transfer function of the induction motor being controlled. The present invention, however, provides a motor controller circuit which differs from the inverse of the motor circuit.

Briefly, the present invention generates a motor slip frequency value and two current magnitude values representing quadrature components of the motor stator current to be generated. Closed-loop control of the motor operation is provided by feeding back a signal representative of the motor shaft speed or position to a circuit which compares this signal with an input command to calculate the torque required from the motor. In contrast with previous motor controllers of the flux-feed-forward type, the controller is not the exact inverse of the motor. The feedback signal is separated into high and low frequency components. The motor controller of the present invention includes additional circuitry which changes the value of $I_T$ from network 39 in response to detected variations in the high frequency components of the feedback signal. The addition of this circuitry causes the motor control circuit to no longer represent the inverse of the motor transfer function network. Since the accuracy of the control of motor torque in known motor controllers is based upon the use of an exact inverse function of the motor transfer function in the motor controller circuit, it would normally be expected that the addition of this circuitry would produce a motor controller having poor response to variations in motor speed rather than improved response. Measurements of actual microprocessor based motor controller systems, however, reveals that the motor controller of the present invention achieve a significantly increased bandwidth compared to the bandwidth which would be achieved without the additional circuitry.

In applications where the motor is controlled by a digital control system, the present invention allows a major improvement in bandwidth of the motor controller without requiring a high throughput of data processed by the digital portion of the controller. In many applications, the digital control is provided by a processor which also performs other functions, and whose data handling capacity is limited. In these applications, the present invention allows substantial improvement in system performance both in providing a higher bandwidth for the motor controller and in reducing the data handling requirements of the digital portion of the system.

DESCRIPTION OF THE DRAWINGS

The advantages and operation of the present invention will become more clear upon reading the following description of the preferred embodiment in conjunction with the accompanying drawings, of which.

DESCRIPTION OF THE PREFERRED EMBODIMENT

Figure 2:
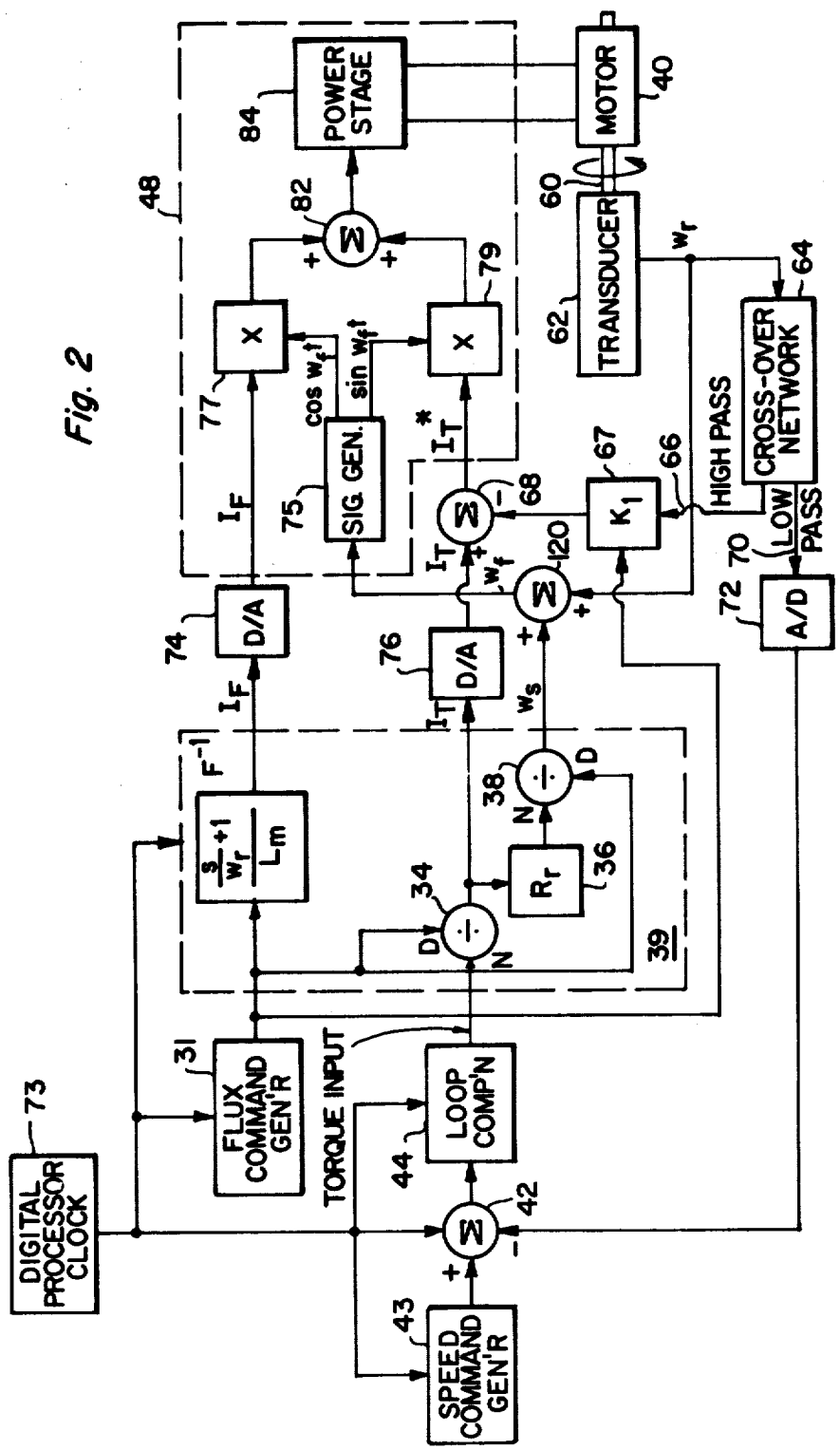
FIG. 2 is a block diagram of a motor controller built in accordance with the invention.

Referring to FIG. 2, there is shown a block diagram of one embodiment of the present invention. For simplicity only a single phase of the controller is shown coupled to power stage 84 and motor 40. The present invention would, however, normally be applied to multi-winding induction motors, as explained in more detail later. The motor shaft 60 is coupled to a transducer 62. The embodiment shown in FIG. 2 controls the motor shaft rotation speed $w_r$, and transducer 62 provides an output representative of $w_r$. As will become more clear below, the present invention is equally applicable to a motor shaft position control loop. The output signal from transducer 62 is applied to a crossover network 64. Crossover network 64 has two outputs. Frequencies above a selected crossover frequency pass along the high pass output 66 to a summing circuit 68 via a controllable gain block 67. Frequencies below the crossover frequency are applied via low pass output 70 to an A/D converter 72. Converter 72 takes the low pass output from crossover network 64 and provides a digital representation thereof.

The low pass output from crossover network 64 and A/D converter 72 is applied to the negative input of difference circuit 42. A signal from input command generator 43 is applied to the positive input of a difference circuit 42. In the embodiment shown in FIG. 2, input command generator 43 would produce a signal representative of the desired speed of motor 40. In applications where the motor shaft position is the variable to be controlled, an outer position loop would be employed. Speed command generator 43 would then be dependent on the difference between a commanded position and measured position as obtained from transducer 62 or an additional encoder on the shaft. The output from difference circuit 42 represents the difference between the desired speed and the actual speed of the motor. The output from circuit 42 is applied to a loop compensation network 44, such as the digital equivalent of a lead-lag network, to insure the stability of the negative feedback loop. The output signal from compensation network 44 represents the torque desired from motor 40 to keep the motor speed synchronized to the input speed command.

Figure 1A:
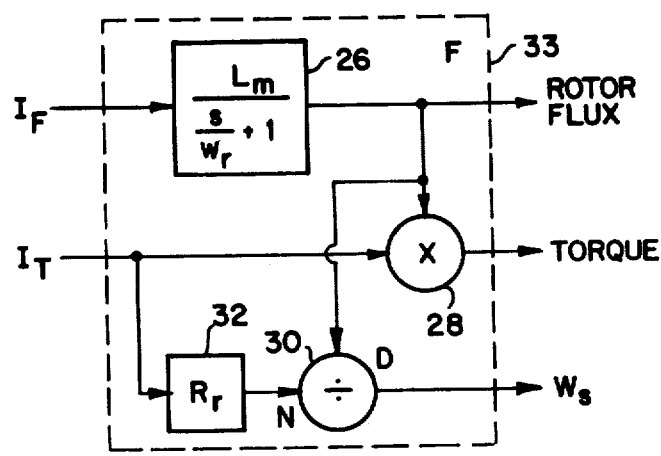
FIGS. 1A, 1B, and 1C are block diagrams showing an induction motor transfer function, and inverse thereof.
Figure 1B:
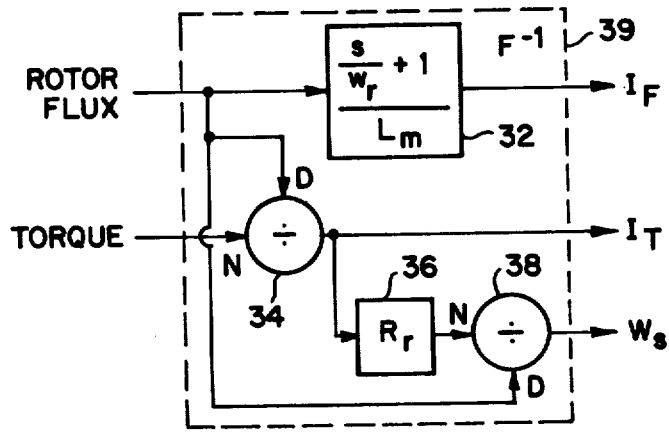
Figure 1C:
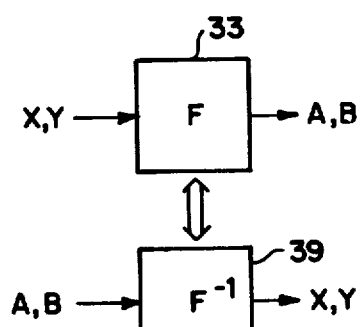

The output signal from network 44 is applied to the torque input of a network 39, similar to that shown in FIG. 1 which represents the inverse transfer function of the induction motor. A signal representing the desired flux level is applied to the flux command input of network 39 by flux command generator 31. The output of flux command generator 31 is also used to control the gain block 67. Typically the gain of block 67, $K_1$, would be made inversely proportional to the output of flux command generator 31.

In many applications, a motor controller is in turn controlled by a digital processor such as a computer or dedicated microprocessor. Examples of such applications would be in industrial machinery where the speed position of a motor is controlled in response to numerical control data. In applications such as these it is frequently advantageous to have the digital processor perform several of the functions shown in FIG. 2. For example, the operations and calculations performed by inverse network 39 in FIG. 2 may be easily and quickly performed or computed by a digital processor with the advantage that the processor may be easily and quickly programmed to control different motor circuits, since the processor variables include only the magnetizing inductance $L_m$, rotor natural frequency $w_r$, and the rotor resistance $R_r$ of the motor. In the embodiment shown in FIG. 2, speed and flux command generators 43 and 31, difference circuit 42, loop compensation network 44, and inverse network 49 are implemented in a digital processor, as shown by processor clock 73 applied thereto. This is explained further below.

Network 39 produces the $I_F$, $I_T$, and $w_s$ signals at its outputs, as described above. The $I_F$ and $I_T$ signals are output as digital signals and are respectively applied to D/A converter circuits 74 and 76. The output from D/A circuits 74 and 76 are analogue representations of the $I_F$ and $I_T$ values.

The $I_F$ output from D/A circuit 74 is directly applied to a first input to stator driver circuit 48. The $I_T$ output from D/A circuit 76 is applied to a positive input of a difference circuit 68. The high pass output from crossover network 64 is applied to the negative input of difference circuit 68, and the output from the difference circuit, designated as $I_T^*$, is applied to a second input to stator driver circuit 48.

As explained above and in the Nabae reference, the outputs from network 39 $I_F$ and $I_T$ are DC values which represent the magnitudes of the quadrature components of the stator field in a frame of reference which is fixed with respect to the rotating stator field. The slip frequency output $w_s$ represents the difference between the motor shaft speed and the speed of rotation of the stator field. Thus, it is necessary to transfer the frame of reference from that of the rotating stator field to a reference which is fixed with respect to the stator windings. The stator field frequency $w_f$ is given by the following equation:

$$w_f = w_s + w_r$$

The stator field frequency $w_f$ may be generated and applied to stator driver circuit 48 along with the $I_F$ and $I_T^*$ values representing the quadrature components of the stator excitation, in the following manner.

The $w_r$ output from transducer 62 is applied to one input of a summing circuit 120. The slip frequency signal $w_s$ from motor inverse circuit 39 is applied to a second input of summer 120. The resulting output from summer circuit 120 represents $w_f$, the desired frequency of the stator field.

The $w_f$ signal from summer 120 is applied to a sine/cosine signal generator 76. In response to the $w_f$ signal, sine/cosine generator 76 produces a cosine $w_f t$ signal and a sine $w_f t$ signal. Thus, in response to detection of the actual motor shaft velocity by transducer 62 and the slip frequency signal from network 39, sine/cosine generator 76 produces two periodic signals in a quadrature relationship at a frequency equal to the desired stator field frequency, $w_f$.

The cosine $w_f$ and sine $w_f$ signals are respectively applied to multiplier circuits 77 and 79. Second inputs to multiplier circuits 77 and 79 are the $I_F$ signal from D/A converter 74 and the $I_T^*$ output signal from summer 68. In this manner, two quadrature-phased signals having a frequency of $w_f$ and having magnitudes of $I_F$ and $I_T^*$ are produced by multipliers 78 and 80.

The output signals from multipliers 77 and 79 are applied to a summing circuit 82 to produce a periodic output signal having a frequency $w_f$ and having a phase and amplitude which are a function of the $I_F$ and $I_T^*$ signals. The output from summer circuit 82 is applied to a power stage 84 which applies the proper current to the stator winding of motor 40. Of course, in a typical application with a three phase motor, generator 75 would output an additional quadrature pair lagging by 120° which would also multiply $I_F$ and $I_T^*$ and generate a second input to power stage 84.

The embodiment shown in FIG. 2 causes the rotational speed of motor 40 to track the speed command from generator 43. In the situation where the feedback loop causes the position of the motor 40 to follow the input signal, the output signal from transducer 62 and A/D converter 72 will be representative of the angular position of the motor shaft rather than the rotational velocity $w_r$ of the motor shaft. Angular velocity information must still be applied to summing circuit 42, however. This may be done in several ways. For example, the angular velocity data may be integrated over time to provide a signal representative of the motor shaft position. Alternatively, a second output may be taken from transducer 62 representative of the motor shaft position, and this output would then be converted to a pulse train, filtered, and applied to summer circuit 42.

As explained above, the difference circuit 42, loop compensation circuit 44, and various others of the motor-controller functions are updated periodically by a digital processor. The period between updates is determined by the digital processor, as represented by processor clock 73. A key parameter of motor control circuit is the bandwidth of the closed-loop circuit. The bandwidth determines the speed with which the motor will respond to a change in an input speed or position command, or alternatively, how fast the circuit can respond to compensate for a change in the motor speed produced, for example, by a variable load on the motor output shaft. Since the precision of an industrial operation is frequently very dependent upon controlling the motor speed and shaft position very closely, the bandwidth of the motor controller circuit in these applications is obviously important.

In a control system such as that shown in FIG. 2 which is controlled by a digital processor, the frequency at which the digital processor samples the shaft speed $w_r$ limits the upper achievable bandwidth of the control loop. It should be clear that the more frequently that the speed of motor 40 is sampled in FIG. 2, the more rapid may be the response of the circuit to a variation in the speed. Since the control system is a closed loop system, it does not matter which functions in the loop the digital processor performs, and a clocked operation anywhere in the loop will limit the bandwidth of the motor controller.

The addition of crossover network 64 and summing circuit 68, however, allows the bandwidth of the entire motor controller circuit to be greatly increased over that allowed by the processing interval of the digital processor. Essentially, the addition of crossover network 64 and summing circuit 68 allows the high frequency velocity terms from transducer 62 to be added directly into the $I_T$ output from the digital processor 39. Referring back to FIG. 1B, it can be seen that variations in the torque input to network 39 appear directly in the $I_T$ output signal after being divided by the rotor flux in divider circuit 34. If the rotor flux input to network 39 is constant or slowly changing, variations in the torque input to network 39 are immediately and proportionally reflected in the $I_T$ output signal. Thus, for a fixed flux level, by choosing the appropriate gain $K_1$ for block 67, high frequency variations in the output from transducer 62 may be added directly to the $I_T$ output from D/A converter 76. In variable flux applications it is desirable that $K_1$ be varied inversely with the flux level.

As discussed above, the addition of crossover network 64 and summer 68 to insert signal terms into the $I_T$ signal path varies the motor controller circuit of FIG. 2 from the exact inverse of the induction motor circuit. Once the controller circuit varies from being the exact inverse of the induction motor model, analysis of the circuitry becomes very difficult. Because of this and the complicated equivalent circuit of induction motors, a complete analysis of the motor controller circuit shown in FIG. 2 would be exceedingly difficult. Furthermore, because of the complicated mathematics necessary to analyze and describe the circuitry of the present invention, it is difficult to gain physical insights from such an analysis of the circuitry. From actual experimental tests, however, it has been discovered that the motor controller circuit of FIG. 2 does in fact provide better dynamic performance and higher bandwidth for a fixed digital processor cycle time than would be the case for an induction motor controller circuit which does not include the alternate path around the digital processing circuitry provided by crossover network 64 and summing circuit 68.

The improvement in operation of the circuitry shown in FIG. 2 may be qualitatively explained in the following manner. While relative to $I_T$ the instantaneous slip frequency $w_s$ may be substantially in error, the phase of the slip frequency signal $w_s$ is the integral of the slip frequency and changes much more slowly. Referring to FIG. 1B, it can be seen that the rotor flux is proportional to $I_F$ times the magnetizing inductance $L_M$ with a delay in response time determined by the rotor time constant, $1/w_r$. Torque is approximately proportional to $I_T$ times the rotor flux. For a fixed or slowly changing rotor flux, the slip frequency is approximately proportional to the torque divided by the rotor flux.

Figure 3:
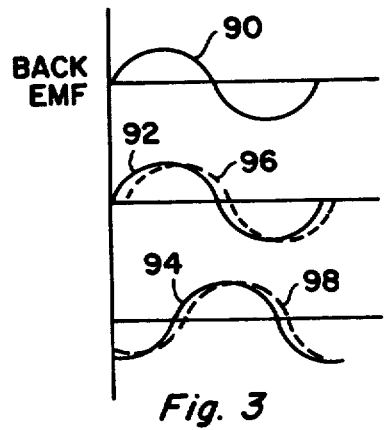
FIG. 3 shows waveforms useful in explaining the invention.

Referring to FIG. 3, several waveforms are shown which are helpful in explaining the effect of small changes in the phase angles of the $I_T$ and $I_F$ values. In FIG. 3, the back EMF of the motor is represented by waveform 90. The component of the stator current determined by the $I_T$ value is shown by waveform 92. This signal is in phase with the back EMF signal 90 and the interaction of the stator current component represented by the $I_T$ waveform 92 in FIG. 3 with the back EMF field shown in waveform 90 causes a positive torque to be applied to the motor rotor. The component of the stator current determined by the $I_F$ value is shown by waveform 94 in FIG. 3. The $I_F$ waveform has a quadrature phase relationship with the $I_T$ waveform, and hence is also in quadrature phase with the back EMF of the motor. Since the $I_F$ and the back EMF waveforms 90 and 94 are shifted by 90 degrees, the net torque produced over each electrical cycle of the motor is zero.

In the circuit shown in FIG. 2, the feeding back of high frequency components around inverse network 39 will affect the $I_T$ and the $w_s$ outputs from network 39. The change in the $I_T$ output from network 39 is essentially compensated for by the addition of the high pass components to the $I_T$ value by summer circuit 68. These components are not, however, added to the $w_s$ output from network 39. Thus, the $w_s$ output from network 39 may contain small errors. Referring to FIG. 3, it can be seen that the instantaneous torque on the motor rotor depends upon the instantaneous phase relationship between the $I_T$ and $I_F$ waveforms and the back EMF of the motor. A small error in $w_s$ will cause a small phase error to slowly accumulate. Dotted waveforms 96 and 98 in FIG. 3 represent the $I_T$ and $I_F$ waveforms with a small phase error. It can be seen that the result of this phase error is that the torque produced by the $I_T$ waveform will be slightly reduced, while the $I_F$ waveform, being no longer exactly in phase quadrature with the back EMF waveform 90, will produce a small torque component. These small errors in the torques produced by the $I_T$ and $I_F$ waveforms applied to motor 40 via the motor stator driver circuit 48 are compensated for by the control action of the loop.

This operation may be alternatively explained in the following manner. Induction motors are usually considered as asynchronous motors. Induction motors are, however, asynchronous motors only in the steady state. For times comparable to or shorter than the rotor time constant (which is typically on the order of several hundred milliseconds), an induction motor behaves very similarly to a synchronous motor. As is well known, in a synchronous motor, torque depends only on stator current, rotor flux, and the phase angle between them. In a similar manner, in an induction motor for times shorter than the rotor time constant, torque can be considered to depend on the stator current, rotor flux, and the slip angle. Thus, high frequency torque variations in an induction motor may be accomplished by varying only the current amplitude, since the phase variations in the $w_s$ waveform will be relatively small even if the frequency variations may have high amplitude, high frequency components due to the high pass filtering of crossover network 64. Since the circuit shown in FIG. 2 is not the exact inverse of the induction motor circuit, this result is not expected. Due to the complex mathematics involved, analysis of the circuitry shown in FIG. 2 does not readily lead one to the qualitative explanations given above. Nevertheless, experimentation shows that the present invention does in fact result in improved performance in an induction motor controller.

Figure 4:
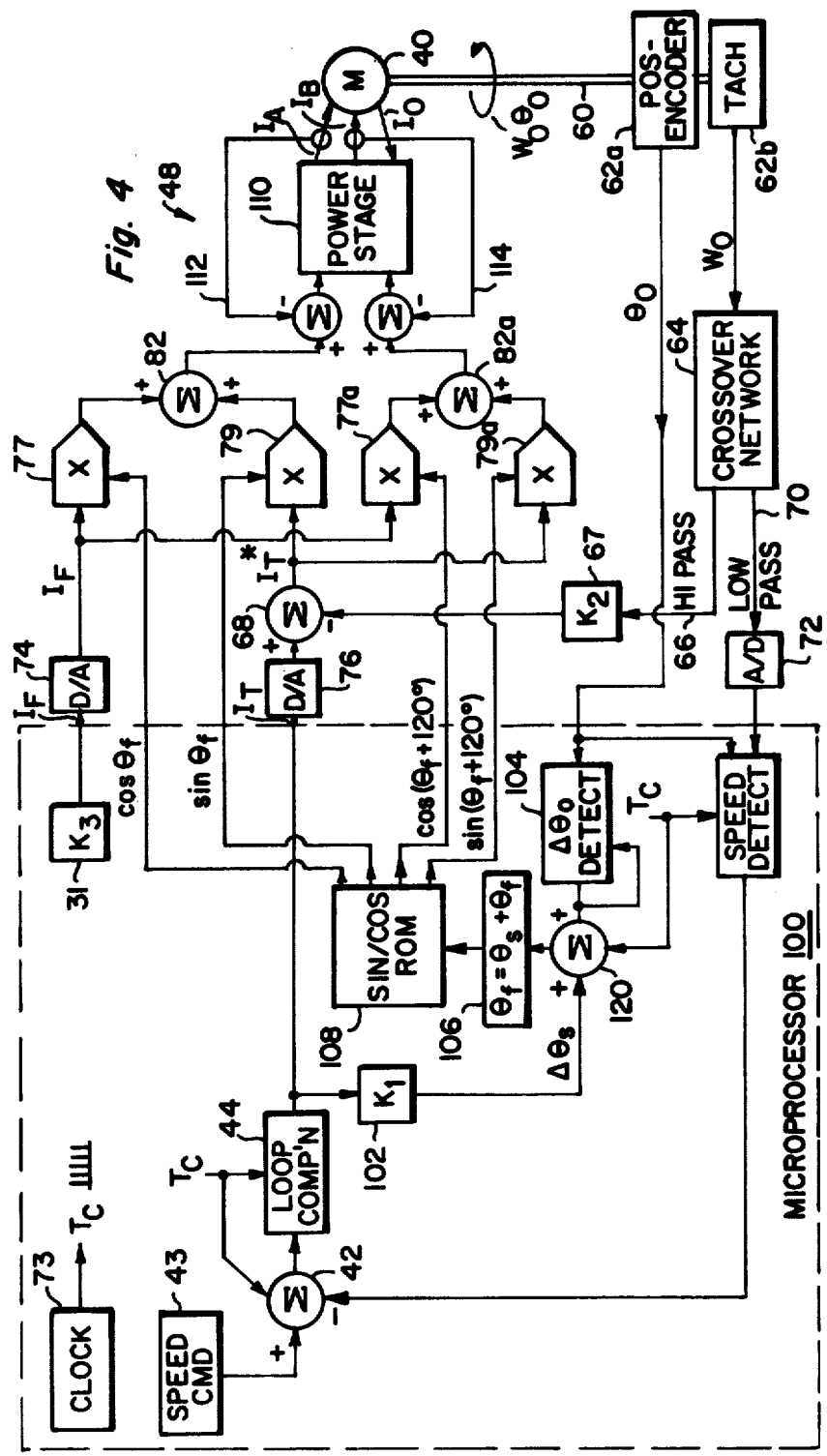
FIG. 4 shows an alternative embodiment of the invention suitable for use with motors having a fixed flux level.

In many applications, the motor flux is not varied, but remains at a constant level. In these applications, the embodiment of the present invention shown in FIG. 2 may be greatly simplified. Referring to FIG. 4, there is shown a more detailed embodiment of the present invention adapted for use in a microprocessor-based motor controller for controlling a three phase induction motor. In this embodiment the flux level remains fixed. The general operation of FIG. 4 is similar to that of the circuitry shown in FIG. 2 and described above. Therefore, only the differences between the operation of the circuitry shown in FIGS. 4 and 2 will be discussed.

In FIG. 4, the motor controller is controlled by a microprocessor 100 which performs many of the functions and calculations required by the motor controller. A digital speed command 43 is applied to the positive input of a difference circuit 42. The output from difference circuit 42 is applied to a loop compensation block 44. The speed command 43 may be provided by the microprocessor itself or may come from a data source external to microprocessor 100. The flux command is a fixed value represented by $K_3$ is block 31 and is equal to the desired flux divided by $L_M$. The output from loop compensation network 44 is applied to a summing circuit 120 via gain block 102. Referring to FIG. 1B, it can be seen that for a fixed rotor flux, the $w_s$ output from inverse network 39 is directly proportional to the torque input to network 39. Thus, the value of the slip frequency in the controller of FIG. 4 may be calculated by multiplying the torque command from loop compensation network 44 by the appropriate constant $K_1$ in block 102. As will be explained in more detail below, microprocessor 100 generates signals at the stator field frequency by periodically augmenting a register which contains a value proportional to the angular position of the motor shaft. For this reason, the output from gain block 102 represents the change in angle $\Delta\theta_s$ which results from integrating the slip frequency $w_s$ over one period of the clock 73 of microprocessor 100. It should be understood that clock 73 does not necessarily represent the actual cycle time of the microprocessor. As discussed above, microprocessor 100 may perform other functions in addition to its operations in the induction motor controller; and the clock signal $T_c$ from clock 73 represents the intervals between which the motor controller values are updated by microprocessor 100.

The instantaneous position of the shaft of motor 40 is detected by a positional encoder 62a which provides at its output a value representative of the angular position $\theta_0$ of the motor shaft 60. The signal from encoder 62a is applied to microprocessor 100. Microprocessor 100 monitors the $\theta_0$ signal from encoder 62a and provides a signal to summing circuit 120 each time that the motor shaft 62 turns through an angle $\Delta\theta_0$, as shown by block 104. Typically, positional encoder 62a provides a digital signal which changes between high and low states with a change in the motor shaft position of a predetermined incremental angle. The signal from encoder 62a is thus assynchronous with respect to the processor clock signal, and the detection operation shown in block 104 is implemented by means of accumulating a preset number of pulses from encoder 62a and on an interrupt basis updating register 106 and outputting signals from sin/-cos ROM 108.

The $\Delta\theta_s$ signal from gain block 102 and the $\Delta\theta_0$ signal from detector 104 are combined in a summer 120. Summer 120 increments a register 106 in response to inputs from block 102 and detection circuit 104 which indicate that the desired stator field should be rotated through a predetermined incremental angle. The output from register 106 is $\theta_f$ which represents the angular position of motor stator current components.

The $\theta_f$ value from register 106 is applied to a sine/cosine ROM 108. In response to an input from register 106, ROM 108 provides four digital outputs representing the sine and cosine of $\theta_f$ and the sine and cosine of $(\theta_f + 120°)$. The sine and cosine $\theta_f$ signals are applied to first inputs to multiplying circuits 77 and 79. Similarly to FIG. 2, the $I_F$ signal from D/A converter 74 and the $I_T^*$ signal from summing circuit 68 are applied to the second inputs of multipliers 77 and 79. The $I_F$ and $I_T^*$ signals are analogue signals. The sine and cosine $\theta_f$ signals from ROM 108 are digital signals. Multipliers 77 and 79 may be easily implemented by means of multipling D/A converters. The outputs from multipliers 77 and 79 are summed in summing circuit 82 which provides at its output a periodic signal having a frequency equal to $w_f$ and having an amplitude and phase determined by the values of $I_F$ and $I_T^*$.

The $I_F$ and $I_T^*$ signals are applied to a second pair of multiplying circuits 77a and 79a. The sin $\theta_f$+ 120°) and cos $(\theta_f+ 120°)$ signals from ROM 108 are applied to the second inputs of multipliers 77a and 79a. The outputs from multipliers 77a and 79a are added in summing circuit 82a which provides at its output a signal similar to the output signal from summing circuit 82 but shifted in phase by 120°.

The output signals from summers 82 and 82a are applied to a power stage circuit 110. Power stage circuit 110 drives three-phased motor 40 with three stator currents 120° apart in phase. In the embodiment shown in FIG. 4, power stage 110 amplifies the two signals from summers 82 and 82a and applies two currents $I_A$ and $I_B$, proportional thereto to motor 40. The current $I_C$ in the third phase of motor 40 is equal to the sum of $I_A$ and $I_B$. The accuracy of the $I_A$ and $I_B$ currents in motor 40 is insured by negative feedback paths 112 and 114.

Motor 40 has its shaft 60 connected to both a position encoder 62a and a tachometer circuit 62b. Position encoder 62a provides an output signal representative of the shaft position $\theta_0$, as described above. Tachometer circuit 62b provides a signal representative of the shaft velocity $w_o$. The output from tachometer 62b is applied to a crossover network 64 which provides high pass and low pass outputs 66 and 70 as discussed above. Typically, crossover network has a crossover frequency equal to 16 Hz, which is consistent with a velocity loop bandwidth of 100 Hz. Typically, the gain of the analogue path via 67 equals the digital path gain via 76, at about 30 Hz.

Using the present invention, as shown in the motor controller circuit of FIG. 4, allows a much higher bandwidth to be achieved than is possible with similar motor controller circuits of previously known types. For example, using a microprocessor having a clock update period $T_C$ of 5 msec, and an 8 bit microprocessor 8085A-2, and a 16 Hz crossover frequency, a 100 Hz velocity bandwidth can be obtained driving a 7½Hp to 15 Hp induction motor. Without crossover network 64 gain 67 and summer 68, a controller of known type similar to that shown in FIG. 4 would be expected to achieve a maximum bandwidth of 30 Hz. Thus, the present invention clearly results in improved performance.

Figure 5:
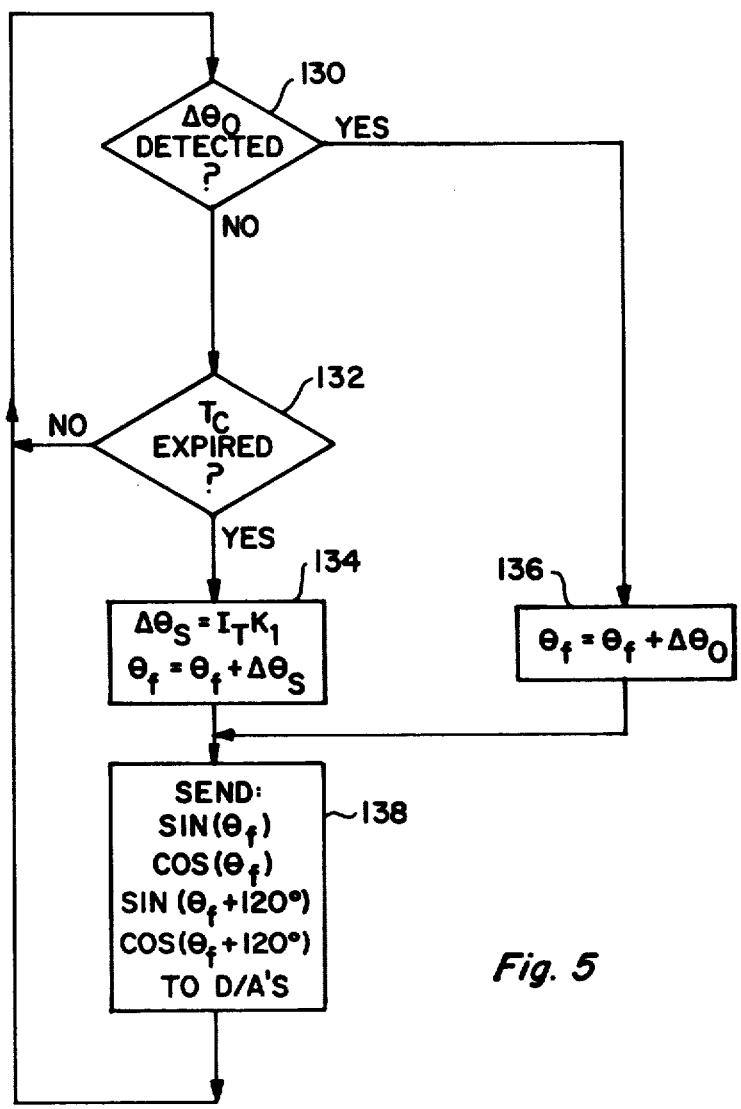
FIG. 5 is a flow diagram showing the steps carried out by the microprocessor of FIG. 4.

The operations and procedures performed by microprocessor 100 in the induction motor controller shown in FIG. 4 may be easily implemented by one of ordinary skill in the art. FIG. 5 is a flow diagram showing one preferred method of implementing the functions performed by microprocessor 100.

Referring to FIG. 5, the processor first checks to see whether the shaft position has changed by $\Delta\theta_0$, block 130. If so, the processor increments $\theta_f$ by $\Delta\theta_0$, block 136, and then proceeds to block 138. If not, the processor next checks to see whether the period $T_c$ between updates has elapsed, block 132. If not the processor returns to block 130, or the processor may branch to other routines for a period of time during which it performs other functions. If $T_c$ has elapsed the processor calculates the current value of $\Delta\theta_s$ and updates $\theta_f$ by adding $\Delta\theta_s$ to $\theta_f$, block 134. Next the processor calculates the values of the sine and cosine functions applied to D/A converters 77, 77a, 79 and 79a. The processor then returns to block 130. It should be appreciated that many alternate procedures may be used to implement the processing steps shown in FIG. 5.

There has been shown and described a new and improved induction motor controller having advantages over previously known induction motor controller circuits. It should be appreciated that people of ordinary skill in the art will make additions and modifications to the present invention in applying it to different motor control circuits. Accordingly, the present invention should not be limited by the description herein of a particular preferred embodiment, rather, the invention should be interpreted only in accordance with the appended claims.

We claim:
1. An induction motor controller for providing closed-loop control of an induction motor, comprising:
drive means for generating an A.C. stator current in each stator winding of the motor in response to first and second inputs applied thereto representative of the amplitudes of quadrature components of the A.C. stator current;
means for monitoring the velocity of the motor rotor and for providing a velocity signal representative thereof;
means responsive to the velocity signal and to a first signal applied thereto representative of desired motor rotor velocity for producing an error signal representative of the difference therebetween;
network means, having a transfer function which is substantially the inverse of the motor transfer function and responsive to first and second inputs respectively representative of motor torque and motor flux level, for producing first and second output signals representative of quadrature components of motor stator current and for producing a slip frequency signal representative of the difference between the motor rotor angular velocity and the frequency of the motor stator current;
wherein the drive means further includes means responsive to the slip frequency signal and to the velocity signal for providing a stator current frequency signal representative of the frequency of the stator current in the stator windings;

means for applying the error signal to the network means first input;

means for applying a signal representative of a desired flux level to the network means second input; and means for combining the network means first output signal and the velocity signal to provide a combined signal and for applying said combined signal to one of the drive means inputs, including:
  means for separating the velocity signal into high frequency components and low frequency components;
  means for adding said separated high frequency components and the network means first output signal to provide the combined signal; and
  means for applying the combined signal to the drive means first input;

means for applying said second network means output signal to the drive means second input.

2. The controller of claim 1 wherein the means for producing an error signal includes means for producing a signal representative of the difference between the first input signal applied thereto and said separated low frequency components.

3. The controller of claim 2 wherein the means for monitoring including means for providing a signal representative of the position of the motor rotor.

4. The controller of claim 2 wherein the drive means further includes a plurality of stator winding driving circuits, each for applying a signal to a corresponding stator winding and each including:
  means responsive to the stator current frequency signal for producing first and second periodic signals having a frequency equal to the stator current frequency and having a phase quadrature relationship:
  means for multiplying the first periodic signal and the combined signal to produce a first product signal:
  means for multiplying the second periodic signal and the network means second output signal to produce a second product signal; and
  means for summing the first and second product signal to provide a signal representative of the phase and magnitude of the stator current in the corresponding stator winding.

5. The controller of claim 4 wherein the means for monitoring provides a first signal representative of the angular position of the motor rotor and a second signal representative of the angular velocity of the motor rotor;
  the monitoring means first signal being applied to the drive means; and
  the monitoring means second signal being applied to the combining means.

6. The controller of claim 1 wherein the means for combining includes a crossover network responsive to the velocity signal for providing first and second signals respectively including frequency components above and below a predetermined crossover frequency; and
  wherein the first signal is added to the network means first output signal to provide said combined signal.

7. The controller of claim 6 wherein the network means is implemented by a digital processor which periodically updates said first and second output signals; and
  wherein the crossover frequency is lower than the frequency at which the digital processor updates the first and second output signals.

8. The controller of claim 6 wherein the monitoring means includes means for providing a signal representative of the position of the motor rotor; and
  wherein said stator current frequency signal is periodically calculated by a digital processor.

9. An induction motor controller, comprising:
  drive means for causing an A.C. stator current to flow in each stator winding of the motor in response to first and second inputs thereto representative of the magnitudes of quadrature components of the stator current;
  transducer means, responsive to movement of the motor rotor, for producing a feedback signal representative of the motor position;
  means for separating the feedback signal into low frequency components and high frequency components;
  detection means, responsive to an input command signal representative of a desired motor rotor position and to the feedback signal low frequency components, for providing an error signal representative of the difference therebetween;
  digital processing means for periodically performing digital computations, including:
    means for providing a flux signal representative of a desired flux level in the motor; and
    network means, having a transfer function which is substantially the inverse of the motor transfer function and responsive to the flux signal and to the error signal, for producing first and second output signals representative of quadrature components of motor stator current;
  means for applying the network means first output signal to the drive means first input; and
  means for combining the feedback signal high frequency components and the network means second output signal to provide a combined signal, and for applying the combined signal to the drive means second input.

10. The motor controller of claim 9 wherein the network means further includes means for providing a slip frequency signal representative of the difference between the motor rotor angular velocity and the frequency of the motor stator current; and
  wherein the controller further comprises means, responsive to the feedback signal and to the slip frequency signal, for providing a stator current frequency signal representative of the A.C. stator current frequency to the drive means.

11. The controller of claim 10 wherein the detection means and the stator current frequency signal providing means are implemented in the digital processor so that the error signal and the stator current frequency signal are periodically computed.

12. The controller of claim 11 wherein the means for separating includes a crossover network for separating the feedback signal into high frequency components above a selected crossover frequency and low frequency components below the selected crossover frequency.

13. The controller of claim 12 wherein the crossover frequency is approximately 16 Hertz.

14. The controller of claim 10 wherein the drive means further includes:
  signal generator means, responsive to the stator current frequency signal, for producing first and second sinusoidal signals having a phase quadrature relationship and a frequency equal to the stator current frequency;

first multiplying means for multiplying the network means first output signal by the first sinusoidal signal to provide a first product signal;

second multiplying means for multiplying the combined signal by the second sinusoidal signal to provide a second product signal; and means for summing the first and second product signals to produce a drive signal representative of the A.C. stator current.

15. The motor controller of claim 14 wherein the controller is adapted for driving a three-phase induction motor and wherein the drive means includes means for driving first and second A.C. currents through first and second windings of the three-phase motor;

wherein the frequency and magnitudes of the first and second A.C. currents are determined by the drive signal; and wherein the first and second A.C. drive signals are separated in phase by 120 electrical degrees.

16. The controller of claim 15 further comprising;

means responsive to the network means first output signal and to the combined signal for producing first and second analog signals respectively representative thereof;

wherein the signal generator means includes means for providing digital sine and cosine signals representative of sine and cosine functions which vary at a rate determined by the stator current frequency signal; and wherein the first and second multiplying means each include a multiplying digital-to-analog converter for respectively multiplying the digital sine and cosine signals by the first and second analog signals to provide the first second product signals.

17. An induction motor controller for controlling an induction motor operating at a substantially fixed flux level, comprising:

drive means for causing an A.C. stator current to flow in each stator winding of the motor in response to first and second inputs thereto representative of the magnitudes of quadrature components of the stator current;

transducer means, responsive to movement of the motor rotor, for producing a feedback signal representative of the rotor position;

means for separating the feedback signal into high frequency and low frequency components;

digital processing means for periodically performing digital computations, including:

detection means, responsive to an input command signal and the feedback signal low frequency components, for providing an error signal representative of the difference therebetween; and means responsive to the feedback signal and to the error signal for providing a stator current frequency signal representative of the frequency of the A.C. stator current;

means for summing the feedback signal high frequency components and the error signal to provide a combined signal;

means for applying the combined signal to the drive means first input; and means for applying a signal representative of flux level to the drive means second input.

* * * * *